US007870383B2

(12) United States Patent
Lingmann

(10) Patent No.: US 7,870,383 B2
(45) Date of Patent: Jan. 11, 2011

(54) SYSTEM, METHOD AND PROGRAM TO UPDATE CERTIFICATES IN A COMPUTER

(75) Inventor: Chad D. Lingmann, Bountiful, UT (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 11/350,566

(22) Filed: Feb. 9, 2006

(65) Prior Publication Data
US 2007/0186098 A1 Aug. 9, 2007

(51) Int. Cl.
H04L 29/00 (2006.01)
(52) U.S. Cl. .................................... 713/158
(58) Field of Classification Search ................. 713/158
See application file for complete search history.

(56) References Cited

U.S. PATENT DOCUMENTS

| 6,134,658 | A | 10/2000 | Multerer et al. ............. 713/175 |
| 6,922,776 | B2 * | 7/2005 | Cook et al. .................. 713/156 |
| 7,054,262 | B2 * | 5/2006 | Gerstel ........................ 370/216 |
| 7,123,074 | B2 * | 10/2006 | Neumann .................... 327/407 |
| 7,199,901 | B2 * | 4/2007 | Watanabe et al. ............ 358/1.9 |
| 7,360,082 | B1 * | 4/2008 | Berthold et al. ............. 713/157 |
| 7,512,974 | B2 * | 3/2009 | Callaghan et al. ............ 726/14 |
| 2004/0243814 | A1 * | 12/2004 | Nakano et al. .............. 713/189 |
| 2004/0243994 | A1 | 12/2004 | Nasu .......................... 717/171 |
| 2005/0039040 | A1 * | 2/2005 | Ransom et al. ............. 713/200 |
| 2005/0081026 | A1 * | 4/2005 | Thornton et al. ............ 713/156 |
| 2005/0160476 | A1 | 7/2005 | Kakii ............................. 726/5 |
| 2006/0047950 | A1 * | 3/2006 | Thayer ....................... 713/156 |
| 2006/0075219 | A1 * | 4/2006 | Callaghan et al. ........... 713/156 |
| 2007/0050625 | A1 * | 3/2007 | Mitchell et al. ............. 713/173 |
| 2008/0086633 | A1 * | 4/2008 | Anderson et al. ........... 713/156 |

* cited by examiner

Primary Examiner—Ponnoreay Pich
Assistant Examiner—Sayed Beheshti Shirazi
(74) Attorney, Agent, or Firm—Yee & Associates, P.C.; Arthur J. Samodovitz

(57) ABSTRACT

System, method and program product for updating a current encryption certificate with a new encryption certificate in a computer having a first plurality of communication channels which require an encryption certificate and a second plurality of communication channels which do not require an encryption certificate. The computer stores the current encryption certificate. The first plurality of communication channels are active and use the current encryption certificate for communication. The second plurality of communication channels are also active. The first plurality of communication channels are deactivated without deactivating the second plurality of communication channels, while substituting the new encryption certificate for the current encryption certificate for subsequent use by the first plurality of communication channels. After the substitution, the first plurality of communication channels are reactivated. After the reactivation, the computer communicates with another computer via one of the first plurality of communication channels using the new encryption certificate.

20 Claims, 3 Drawing Sheets

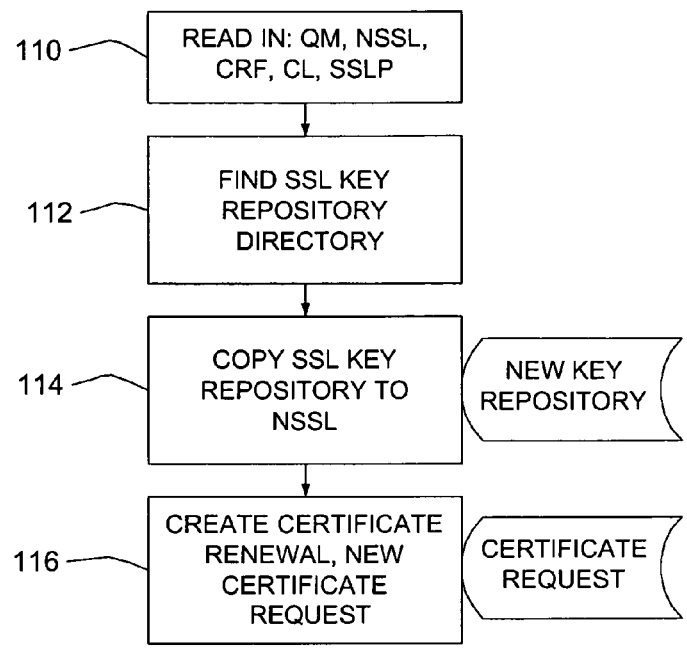
FIG. 2a
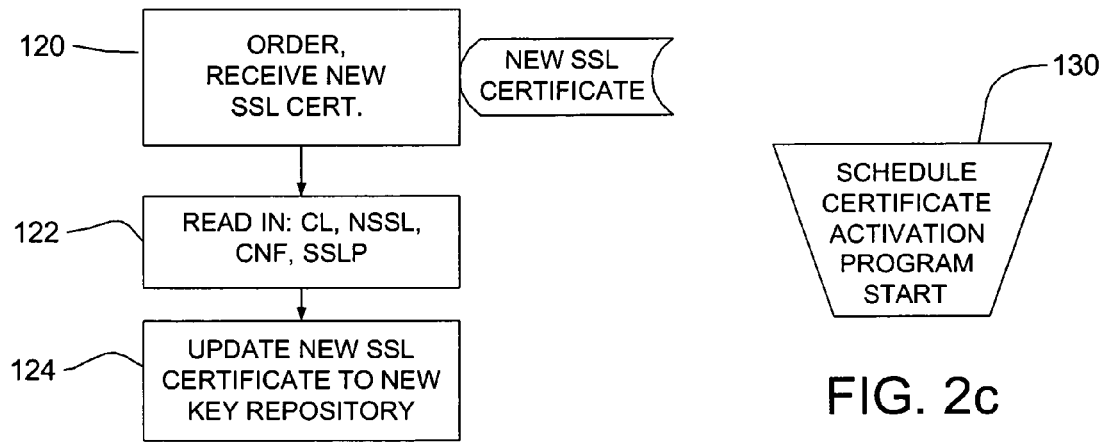
FIG. 2b
FIG. 2c

SYSTEM, METHOD AND PROGRAM TO UPDATE CERTIFICATES IN A COMPUTER

FIELD OF THE INVENTION

The invention relates generally to computer systems, and more specifically to updating encryption certificates used for communication between computers.

BACKGROUND OF THE INVENTION

It is known to encrypt communications between computers with a certificate provided by a certificate authority to provide security. For example, a Secure Sockets Layer ("SSL") certificate can be obtained from a certificate authority server to encrypt communications from those communication channels of a computer that utilize the certificate. The SSL certificate is similar to an encryption key generated by a sending computer or a recipient computer, except that the SSL certificate is issued by a certificate authority and is part of a key pair consisting of a private key and a public key generated by the certificate authority. The recipient knows how to decrypt an SSL communication by using the generally available certificate authority keys paired with the public key provided to the computer authority for use as the owned public key completing the pair to secure the communications. Typically, the SSL certificate is valid for a predetermined period, such as one year, and the sending computer can encrypt its messages with the same SSL certificate for the predetermined period. At the end of the predetermined period, the certificate authority notifies the purchaser of the certificate of the sending computer that the existing SSL certificate will expire. In response, the user typically requests another SSL certificate, and the certificate authority returns another SSL certificate to the sending computer. Next, the user shuts down all communications to and from the computer, even communications to and from channels that do not use an encryption key. In one example where the computer is communicating using an IBM WebSphere MQ 5.3 program, the user shuts down communications by shutting down a communication queue manager ("QM") program which manages all communications to and from the computer, both SSL channels and nonSSL channels. While the computer's communications are shut down, the user installs the new certificate by loading it into a predetermined certificate file (for example, by using a gsk6cmd utility to update a /var/mqm/qmgrs/QUEMANAGER/ssl/key.kdb flat file key repository, in the case of the IBM WebSphere MQ program), replacing the expired certificate. This shut down of all the communication channels lasts until the user has installed the new certificate in the certificate file, and reopens the communications (for example, by restarting the communication queue manager program, and then verifying that the communication channels can negotiate with the remote queue manager program and begin SSL communication). While the foregoing technique is effective in installing a new SSL certificate, it results in too much down time of all communications to and from the computer.

Accordingly, an object of the present invention is to reduce impact on communications to and from a computer while updating an SSL certificate or other encryption certificate required for some of the communication channels.

SUMMARY OF THE INVENTION

The present invention resides in a system, method and program product for updating a current encryption certificate with a new encryption certificate in a computer having a first plurality of communication channels which require an encryption certificate and a second plurality of communication channels which do not require an encryption certificate. The computer stores the current encryption certificate. The first plurality of communication channels are active and use the current encryption certificate for communication. The second plurality of communication channels are also active. The first plurality of communication channels are deactivated without deactivating the second plurality of communication channels, while substituting the new encryption certificate for the current encryption certificate for subsequent use by the first plurality of communication channels. After the substitution, the first plurality of communication channels are reactivated. After the reactivation, the computer communicates with another computer via one of the first plurality of communication channels using the new encryption certificate. By way of example, the current and new encryption certificates are SSL certificates.

According to features of the present invention, there is communication between the computer and one or more other computers via the second plurality of communication channels during the identifying, deactivating, substituting and reactivating processes, without interruption of the communications over the second plurality of communication channels.

BRIEF DESCRIPTION OF THE FIGURES

FIGS. 2(a), 2(b), 2(c), 2(d) and 2(e) form a flow chart of the certificate update program and related processing, according to the present invention.

DETAILED DESCRIPTION OF THE PREFERRED EMBODIMENTS

Figure 1:
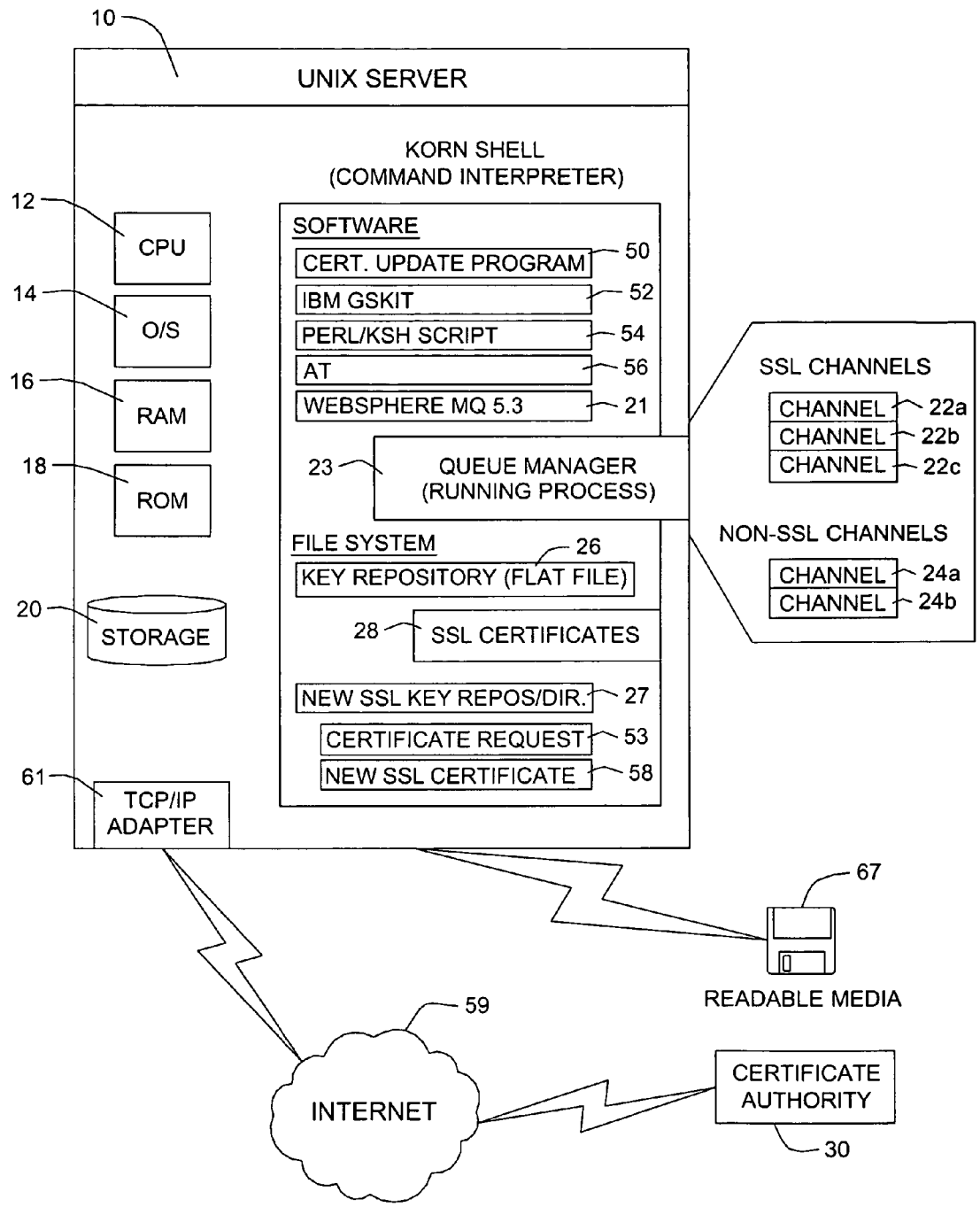
FIG. 1 is a block diagram of a computer which includes a certificate update program according to the present invention, and a known certificate authority server.

The present invention will now be described in detail with reference to the figures. FIG. 1 illustrates a computer 10 (such as a UNIX server) with programming to update SSL certificates or other certificates used to encrypt communications. Computer 10 includes a CPU 12, operating system 14, RAM 16, ROM 18 and storage 20 according to the prior art. Program instructions are stored in a functional form in a computer readable storage, such as storage 20, for execution by CPU 12 via a memory. In these examples, RAM 16 and ROM 18 are examples of memory. In the illustrated example, computer 10 also includes a message handling program 21 (such as IBM WebSphere Message Queuing program), SSL communication channels 22a,b,c, and nonSSL communication channels 24a,b such as unsecured (non-SSLCIPH) channels, according to the prior art. FIG. 1 also illustrates a queue manager program 23 according to the prior art to queue messages to be communicated to recipient computers (not shown) via SSL communication channels 22a,b,c and non SSL communication channels 24a,b. In the illustrated example, the queue manager program 23 is part of the message handling program 21 such as IBM WebSphere Message Queuing program. Computer 10 also includes a Current Key Repository file 26 to store current/valid certificates 28 (such as SSL certificates) or other types of encryption keys.

FIG. 1 also illustrates a remote SSL certificate authority server 30 according to the prior art to provide encryption certificates to computer 10, as needed. Typically, an SSL certificate is valid for one to many years, and then expires. Upon expiration of a certificate, the certificate authority server 30 notifies the purchaser of the certificate for computer 10, who is often an administrator of the computer. Then, the administrator can request, download and install a new certificate, replacing the currently expiring certificate.

As further illustrated in FIG. 1, computer 10 also includes a certificate update program generally designated 50 according to the present invention to update certificates in computer 10. As explained in more detail below, certificate update program 50 includes a utility 52 (for example, an IBM GSKIT utility) to construct a request for a new certificate, and a script program 54 (for example, a Korn Shell or Perl script) to selectively stop the SSL channels when the certificate is to be updated and then activate the new certificate. Certificate update program 50 also includes a UNIX AT Scheduler program 56 to determine when to invoke the script program 54 to stop the SSL channels and activate the new certificate.

Figures 2D, 2E:
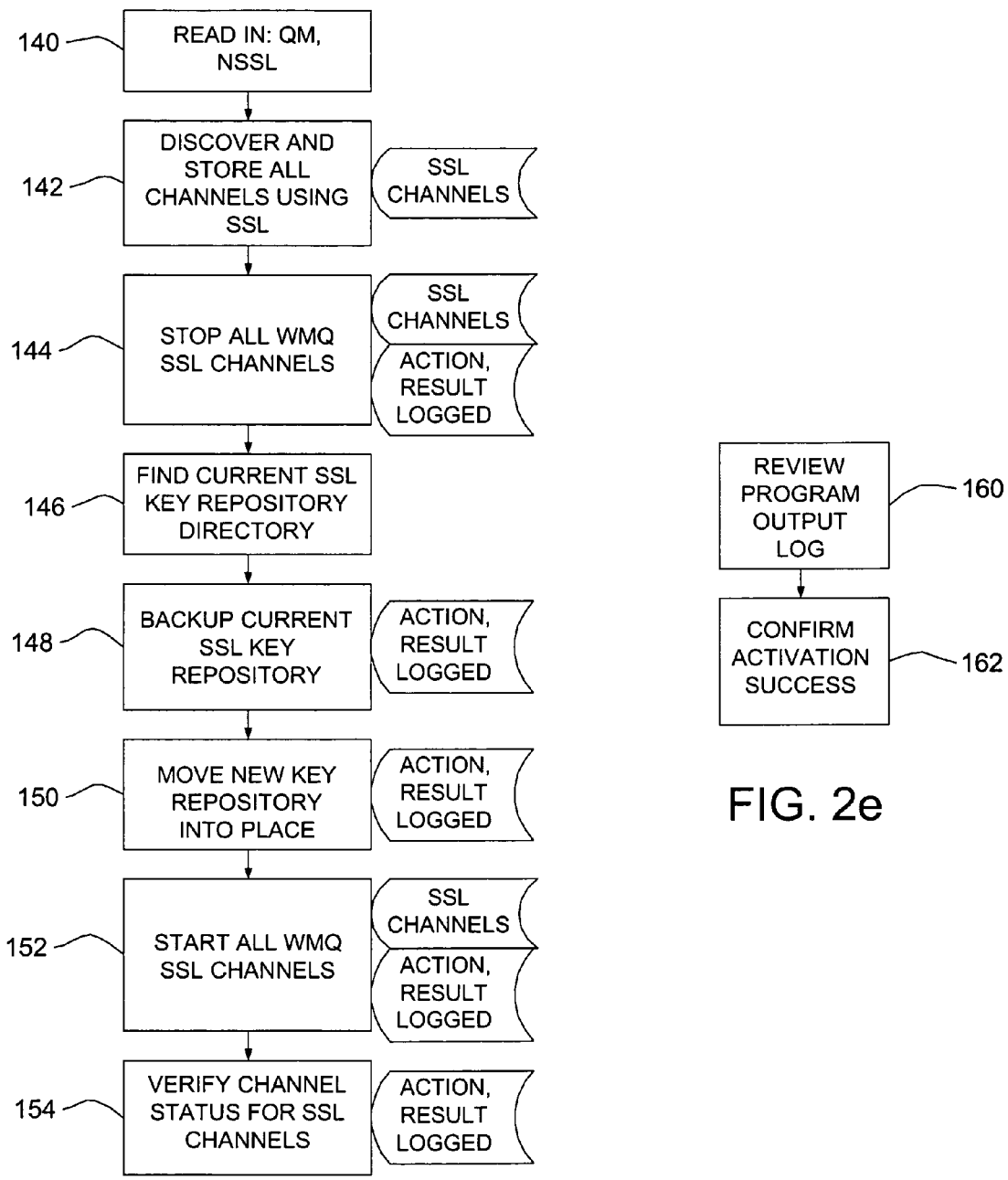

FIGS. 2(a-e) illustrate the function and operation of program 50, in more detail, to obtain and activate a new SSL or other certificate while minimizing interruption of communications to and from computer 20.

In steps 110, 112, 114 and 116, program 50 sets up computer 10 to obtain a new certificate (when a current certificate that is currently in use is soon to expire), without interfering with (a) the current SSL certificate repository 26 that currently stores the current key, or (b) communications using the current key. More specifically, in step 110, an administrator of computer 10 invokes the Korn Shell or Perl script 54 for requesting a new certificate and specifies a name of queue manager program 23, an identity of a New SSL Directory 27 ("NSSL"), a name of a certificate request file 53 ("CRF") and an SSL key repository password ("SSLP"). The certificate request file contains a string of characters used to request a certificate from certificate authority server 30, although it needs parameters to complete the request as described below. Also in step 110, the administrator specifies whether this is a renewal request for an expiring certificate or a new request for a certificate for a new computer. In step 112, the script 54 connects to the queue manager 23 and requests from the queue manager 23 the identity of the currently used SSL Key Repository 26. In step-114, the script 54 copies the currently used SSL Key Repository 26 to the New SSL Directory 27 in preparation to download and update the certificate. In step 116, based on administrator selection of a renew or new certificate request parameter, script 54 initiates GSKit commands using the SSL key repository password. In response, the GSKit program 52 connects to the new Key Repository 27 and creates a renewal request or new request, as the case may be, for a new SSL certificate 58. GSKit program 52 is a Java based program using the installed Java JRE on computer 20. In response to its initiation, Gskit program 52 creates the request in the new Key Repository 27 and stores the request in the Certificate Request File 53 to be provided to the certificate authority for generation of the new certificate.

In steps 120 the queue manager 23 administrator orders the new certificate from certificate authority server 30, without shutting down any of the communication channels 22a,b,c or 24a,b of computer 20. More specifically, in step 120, the administrator of computer 20 uploads/sends the program/commands stored in the certificate request file 53 requesting the new certificate to the certificate authority server 30. Also in step 120, the administrator makes electronic payment for the new certificate. After receiving the certificate request and payment, the certificate authority server 30 returns a new certificate to computer 20,. and the administrator copies the new certificate with the new certificate file name ("CFN") to the New SSL Directory 27 (step 120). In step 122, the administrator enters a certificate label ("CL"), name of the New SSL Directory 27, name of certificate request file 53, and SSL key repository password, using the script 54, as part of the program 54 execution string. In step 122, the administrator also specifies whether this is a renewal request for an expiring certificate or a new request for a certificate. In step 124, the script 54 updates the New SSL Key Repository in the New SSL Directory 27 using Gskit commands, with the name of the new certificate file using the certificate label.

In step 130, the administrator determines an allowed time to activate or change the SSL certificate to the new one that was recently received and stored in the New SSL Directory 27. The administrator determines the allowed time by invoking the script 54 which queries the UNIX AT Scheduler program 56 using the UNIX "AT" command. To invoke the AT command, the administrator enters the name of program 50 and requisite parameters, i.e. name of queue manager program 23 and New SSL Directory 27. The administrator utilizes the UNIX AT command to initiate execution of program 50 at the specified "allowed time" (step 130), as decried below.

In steps 140, 142, 144, 146, 148, 150, 152 and 154, program 50 activates the new SSL certificate 58 to replace the current SSL certificate, if any. More specifically, in step 140, the Unix script 54 reads in the name of the queue manager 23 and the New SSL Directory 27. In step 142, the script 54 connects to the queue manager 23 and requests from the queue manager 23 the identity of the channels which use SSL. The queue manager 23 knows which channels use SSL by querying a configuration file. Then, script 54 stores the identity of all the SSL channels, i.e. channels 22a,b,c, for future use. In step 144, the script 54 formats and issues commands to the queue manager program 23 to stop all channels that use SSL, i.e. channels 22a,b,c, without stopping the other channels, i.e. channels 24a,b. Also in step 144, the script 54 logs its attempt to stop or deactivate the SSL channels, and the result, i.e. whether they were in fact stopped. The script 54 determines if the SSL channels were in fact stopped by issuing a command to the queue manager and verifying the status of stopped for the SSL channels 22a,b,c. In step 146, the script 54 connects to the queue manager 23 and requests from the queue manager 23 the identity of the currently used SSL Key Repository 26. The queue manager 23 knows the identity of the currently used SSL Key Repository 26 as it is a stored queue manager 21 value. In step 148, the script 54 changes the names of the files in the current SSL Key Repository 26 to backup file names and logs the attempt to change the file names and result, i.e. success or failure. In step 150, the script 54 moves the new SSL Key Repository within the New SSL Directory 27 into the active location specified by the queue manager 23, thus activating the new SSL certificate for use by the queue manager 23 for subsequent communications over SSL channels 22a,b,c. In step 150, the script 54 also logs the attempt to move the new SSL Key Repository, and the result, i.e. success or failure. In step 152, the script 54 issues formatted commands to the queue manager 23 to restart all SSL channels 22a,b,c, and logs this attempt and the result, i.e. success or failure. In step 154, the script 54 requests from the queue manager program 23 the status of the SSL channels, and logs the request and result, i.e. success or failure.

In steps 160 and 162, the administrator reviews the log to determine whether the new SSL certificate was successfully installed and activated, replacing the expiring certificate.

Program 50 can be loaded into computer 20 from a computer readable media 67 such as magnetic tape or disk, optical CD, DVD, etc. or downloaded via the Internet 59 through TCP/IP adapter 61. A computer readable storage device is a type of computer readable media. A computer readable storage device is not a signal per se, but can store signals for program instructions on it.

Based on the foregoing, system, method and program product for updating SSL or other certificates have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed:

1. A method for substituting a current encryption certificate with a new encryption certificate in a first computer, said method comprising the steps of:
    stopping, by a CPU, a message handling program from sending and receiving first messages over a first plurality of communication channels for the first computer without stopping the message handling program from sending and receiving second messages over a second plurality of communication channels for the first computer, while substituting said new encryption certificate for said current encryption certificate for subsequent use by said first plurality of communication channels, wherein said first plurality of communication channels require an encryption certificate for the first computer to communicate with other computers and said second plurality of communication channels does not require said encryption certificate for the first computer to communicate with the other computers, the first computer stores said current encryption certificate, said first plurality of communication channels is active and uses said current encryption certificate for communication, and said second plurality of communication channels also is active for the first computer to communicate with the other computers;
    in response to substituting said new encryption certificate for said current encryption certificate for said subsequent use by the message handling program in sending and receiving the third messages over said first plurality of communication channels, starting, by said CPU, the message handling program to send and receive the third messages over said first plurality of communication channels; and
    in response to starting, by said CPU, the message handling program for sending and receiving the third messages over said first plurality of communications channels, communicating, by the first computer, with another computer via one of said first plurality of communication channels using said new encryption certificate.

2. A method as set forth in claim 1 wherein the identifying, deactivating, substituting and reactivating steps are performed automatically.

3. A method as set forth in claim 1 further comprising the step of communicating via said second plurality of communication channels during the deactivating and reactivating steps.

4. A method as set forth in claim 3, wherein the identifying, deactivating, substituting and reactivating steps are performed automatically without interruption of communications over said second plurality of communication channels.

5. A method as set forth in claim 1, wherein the deactivating and reactivating steps are performed without interruption of the communications over said second plurality of communication channels.

6. A method as set forth in claim 1, wherein before the deactivating step, further comprising the step of downloading said new encryption certificate to the first computer.

7. A computer system for substituting a current encryption certificate with a new encryption certificate in a first computer, said computer system comprising:
    a CPU, a computer readable storage, and a memory;
    first program instructions for stopping a message handling program from sending and receiving first messages over a first plurality of communication channels for the first computer without stopping the message handling program from sending second messages over a second plurality of communication channels for the computer system, while substituting said new encryption certificate for said current encryption certificate for subsequent use by said first plurality of communication channels, wherein said first plurality of communication channels require an encryption certificate for the computer system to communicate with other computers and said second plurality of communication channels does not require said encryption certificate, the computer system stores said current encryption certificate, said first plurality of communication channels is active and uses said current encryption certificate for communication for the computer system to communicate with the other computers, and said second plurality of communication channels also is active for the computer system to communicate with the other computers;
    second program instructions, responsive to substituting said new encryption certificate for said current encryption certificate for said subsequent use by said first plurality of communication channels, for starting the message handling program to send and receive third messages over said first plurality of communication channels; and
    third program instructions, responsive to starting the message handling program for sending and receiving the third messages over said first plurality of communication channels, for the computer system communicating with another computer via one of said first plurality of communication channels using said new encryption certificate, wherein the first program instructions, the second program instructions, and the third program instructions are stored in the computer readable storage for execution by the CPU via the memory in the computer system.

8. A system as set forth in claim 7 wherein said current and new encryption certificates are SSL certificates.

9. A system as set forth in claim 7, wherein the first program instructions, second program instructions, and third program instructions are automatic.

10. A system as set forth in claim 7 further comprising fourth program instructions for communicating between the computer system and one or more of the other computers via said second plurality of communication channels while the first program instructions, the second program instructions, and the third program instructions are running.

11. A system as set forth in claim 10, wherein running of the first program instructions, second program instructions, and third program instructions is automatic and does not interrupt communications over said second plurality of communication channels.

12. A system as set forth in claim 7, wherein running of the first program instructions, second program instructions, and third program instructions is automatic and does not interrupt communications over said second plurality of communication channels.

13. A system as set forth in claim 7 further comprising fourth program instructions for downloading said new encryption certificate to the first computer.

14. A computer program product for updating a current encryption certificate with a new encryption certificate in a computer system, said computer program product comprising:
   a computer readable storage device;
   first program instructions to stop a message handling program from sending and receiving first messages over a first plurality of communication channels without stopping the message handling program from sending and receiving second messages over a second plurality of communication channels, while substituting said new encryption certificate for said current encryption certificate for subsequent use by said first plurality of communication channels, wherein said first plurality of communication channels require an encryption certificate for a first computer to communicate with other computers and said second plurality of communication channels does not require said encryption certificate, the first computer stores said current encryption certificate, said first plurality of communication channels is active and uses said current encryption certificate for the first computer to communicate with the other computers, and said second plurality of communication channels also are active for the first computer to communicate with the other computers;
   second program instructions, responsive to substituting said new encryption certificate for said current encryption certificate for said subsequent use by said first plurality of communication channels, to start the message handling program for sending and receiving third messages over said first plurality of communication channels; and
   third program instructions, responsive to starting the message handling program for sending and receiving the third messages over said first plurality of communication channels, to communicate, by the first computer, with another computer via one of said first plurality of communication channels using said new encryption certificate, wherein the first, the second, and the third program instructions are stored on said computer readable storage device.

15. A computer program product as set forth in claim 14 wherein said current and new encryption certificates are SSL certificates.

16. A computer program product as set forth in claim 14 further comprising fourth program instructions to communicate between the first computer and one or more of the other computers via said second plurality of communication channels concurrent with running the first program instructions, the second program instructions, and the third program instructions, and wherein the fourth program instructions are stored on said computer readable storage device.

17. A computer program product as set forth in claim 16, wherein running the first program instructions, second program instructions, and third program instructions does not interrupt communications over said second plurality of communication channels.

18. A computer program product as set forth in claim 14, wherein the first program instructions, second program instructions, and third program instructions do not interrupt communications over said second plurality of communication channels.

19. A computer program product as set forth in claim 14 further comprising fourth program instructions to download said new encryption certificate to the first computer, wherein the fourth program instructions are stored on said computer readable storage media.

20. The method of claim 1 further comprising:
   prior to stopping, by said CPU, the message handling program, sending a request for a certificate renewal of said current encryption certificate to a certificate authority server;
   receiving said new encryption certificate from the certificate authority server; storing said new encryption certificate in a new key repository file; and scheduling a time to replace a current key repository file with the new key repository file;
   stopping, by said CPU, the message handling program from sending and receiving the first messages over said first plurality of communication channels for the first computer without stopping the message handling program from sending and receiving the second messages over said second plurality of communication channels for the first computer, while substituting said new encryption certificate for said current encryption certificate for said subsequent use by said first plurality of communication channels comprises:
   stopping, by said CPU, the message handling program from sending and receiving the first messages over said first plurality of communication channels for the first computer without stopping the message handling program from sending and receiving the second messages over said second plurality of communication channels for the first computer, while replacing said current key repository file with the new key repository file for said subsequent use by said first plurality of communication channels at the time scheduled.

* * * * *